United States Patent
McGrath et al.

(10) Patent No.: US 9,009,944 B2
(45) Date of Patent: Apr. 21, 2015

(54) ASSEMBLY OF WET ELECTROSTATIC PRECIPITATOR

(75) Inventors: Paul McGrath, Mississauga (CA); Robert A. Allan, Kitchener (CA)

(73) Assignee: Megtec Turbosonic Inc., Waterloo (CA)

( * ) Notice: Subject to any disclaimer, the term of this patent is extended or adjusted under 35 U.S.C. 154(b) by 129 days.

(21) Appl. No.: 13/394,828

(22) PCT Filed: Sep. 9, 2010

(86) PCT No.: PCT/CA2010/001404
§ 371 (c)(1),
(2), (4) Date: May 24, 2012

(87) PCT Pub. No.: WO2011/029186
PCT Pub. Date: Mar. 17, 2011

(65) Prior Publication Data
US 2012/0222282 A1   Sep. 6, 2012

Related U.S. Application Data

(60) Provisional application No. 61/272,303, filed on Sep. 9, 2009.

(51) Int. Cl.
| | | |
|---|---|---|
| B23B 3/28 | (2006.01) | |
| B32B 3/28 | (2006.01) | |
| B32B 3/12 | (2006.01) | |
| B32B 5/26 | (2006.01) | |

(Continued)

(52) U.S. Cl.
CPC ... *B32B 3/28* (2013.01); *B32B 3/12* (2013.01); *B32B 5/26* (2013.01); *B32B 5/28* (2013.01); *B32B 7/12* (2013.01); *B32B 9/00* (2013.01); *B32B 27/04* (2013.01); *B31D 3/005* (2013.01); *B03C 3/16* (2013.01); *B03C 3/49* (2013.01); *B03C 3/64* (2013.01)

(58) Field of Classification Search
CPC .......................................... B03C 3/16
USPC ..................... 29/419.1, 469.5, 842, 874, 884; 428/118
See application file for complete search history.

(56) References Cited

U.S. PATENT DOCUMENTS 1,602,597 A * 10/1926 Staude ........................ 493/327
3,765,154 A   10/1973 Hardt et al.
(Continued)

FOREIGN PATENT DOCUMENTS

DE        30 27 307        5/1981
DE    102004001463 A1     8/2005
(Continued)

OTHER PUBLICATIONS

Canadian Office Action for Canadian Patent Application No. 2,773,620, dated Nov. 4, 2014.
(Continued)

*Primary Examiner* — David Bryant
*Assistant Examiner* — Steven A Maynard

(57) ABSTRACT

Wet electrostatic precipitator (WESP) collector tube bundles are formed by a procedure in which strips of conductive material are corrugated, intended abutting surfaces of the corrugated strips are abraded, adhesive is applied to the abraded surfaces, multiple ones of the corrugated strips are assembled with corrugation in abutting relationship, and outer panels are assembled with the resulting hexagonal tube bundle.

2 Claims, 5 Drawing Sheets

"Stacked Panels" forming the hexagonal tubes

(51) Int. Cl.
*B32B 5/28* (2006.01)
*B32B 7/12* (2006.01)
*B32B 9/00* (2006.01)
*B32B 27/04* (2006.01)
*B31D 3/00* (2006.01)
*B03C 3/16* (2006.01)
*B03C 3/49* (2006.01)
*B03C 3/64* (2006.01)

(56) References Cited

U.S. PATENT DOCUMENTS

| | | | |
|---|---|---|---|
| 3,793,802 A | | 2/1974 | Hardt |
| 3,883,328 A | | 5/1975 | Spain |
| 3,918,939 A | | 11/1975 | Hardt |
| 4,155,792 A | | 5/1979 | Gelhaar et al. |
| 4,247,307 A | | 1/1981 | Chang |
| 4,507,341 A | * | 3/1985 | Heseltine ............ 428/78 |
| 5,254,155 A | | 10/1993 | Mensi |
| 5,395,430 A | | 3/1995 | Lundgren et al. |
| 5,498,462 A | * | 3/1996 | Darfler ............ 428/116 |
| 5,626,652 A | | 5/1997 | Kohl et al. |
| 5,714,226 A | * | 2/1998 | Disselbeck ............ 428/116 |
| 6,071,330 A | | 6/2000 | Matsubara et al. |
| 6,231,643 B1 | | 5/2001 | Pasic et al. |
| 6,508,861 B1 | | 1/2003 | Ray |
| 6,599,349 B1 | | 7/2003 | Scharkowski |
| 7,938,146 B2 | * | 5/2011 | Brooks et al. ............ 138/99 |
| 8,597,416 B2 | | 12/2013 | Allan |
| 2003/0082315 A1 | | 5/2003 | Mehlman et al. |
| 2005/0123717 A1 | | 6/2005 | Shen et al. |
| 2006/0230938 A1 | | 10/2006 | Ray et al. |
| 2007/0051237 A1 | | 3/2007 | Furukawa et al. |
| 2007/0201183 A1 | | 8/2007 | Komatsu et al. |
| 2007/0283903 A1 | | 12/2007 | Bologa et al. |
| 2008/0190296 A1 | | 8/2008 | Alam |
| 2009/0142980 A1 | | 6/2009 | Chen et al. |

FOREIGN PATENT DOCUMENTS

| | | | |
|---|---|---|---|
| EP | 0734772 B1 | * 2/1996 | ............ B03C 3/155 |
| GB | 1413127 | 11/1975 | |
| JP | S60 149449 | 8/1985 | |
| WO | WO2008/154735 | 12/2008 | |
| WO | WO2010/108256 | 9/2010 | |
| WO | 2011/120137 A1 | 10/2011 | |

OTHER PUBLICATIONS

European Search Report for European Patent Application No. 12763929.2, dated Nov. 3, 2014.
Supplementary European Search Report for European Patent Application No. 10814843.8, dated Dec. 11, 2013.
International Preliminary report on Patentability for International Application No. PCT/CA2010/001404, dated Mar. 13, 2012.
First Chinese Office Action for Chinese Patent Application No. 2010800227960.0, dated Aug. 13, 2013.
Second Chinese Office Action for Chinese Patent Application No. 2010800227960.0, dated Jul. 30, 2014.
International Preliminary report on Patentability for International Application No. PCT/CA2010/000377, dated Sep. 27, 2011.
International Preliminary report on Patentability for International Application No. PCT/CA2011/000327, dated Oct. 2, 2012.
International Search Report for International Application No. PCT/CA2011/000327, dated Jul. 14, 2011.
Gas Cleaning System—Wet Electrostatic Precipitators, DKL Engineering, Inc., Copyright 2005-2008, URL: http://www.sulphuric-acid.com/techmanual/esp.htm.
Parker, K. et al., "Electrostatic Precipitator (ESP) Training Manual", Arcadis Geraghty & Miller, Jul. 2004.
APTI—Virtual Classroom, "Lesson 3: ESP Design Parameters and Their Effects on Collection Efficiency", pp. 3-1-3-34, URL: http://yosemite.epa.gov/oaqps/eogtrain.nsf/DisplayView/SI_412B_3?OpenDocument.

* cited by examiner

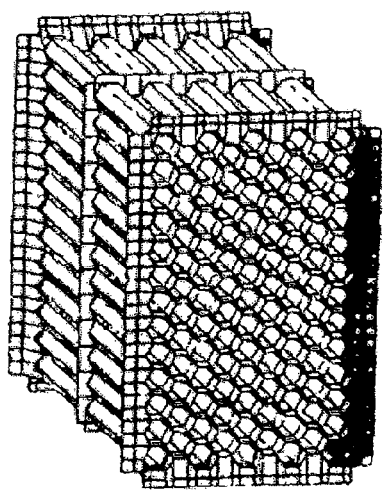
FIGURE 1: *WESP Bundle Section produced using the "Stacked Panel Method"*
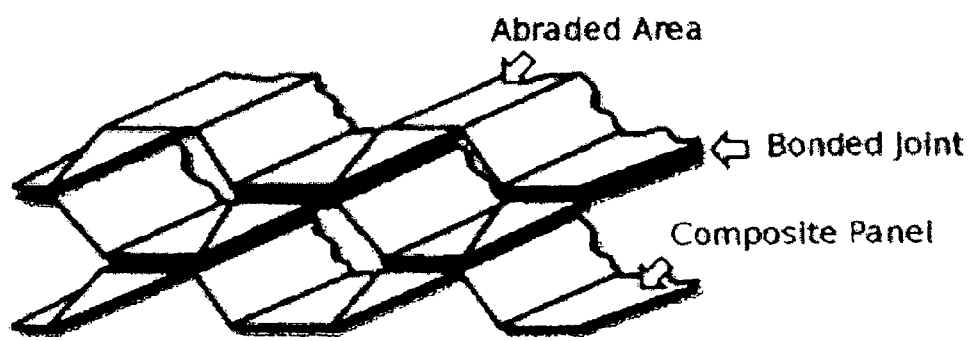
FIGURE 2: *"Stacked Panels" forming the hexagonal tubes*

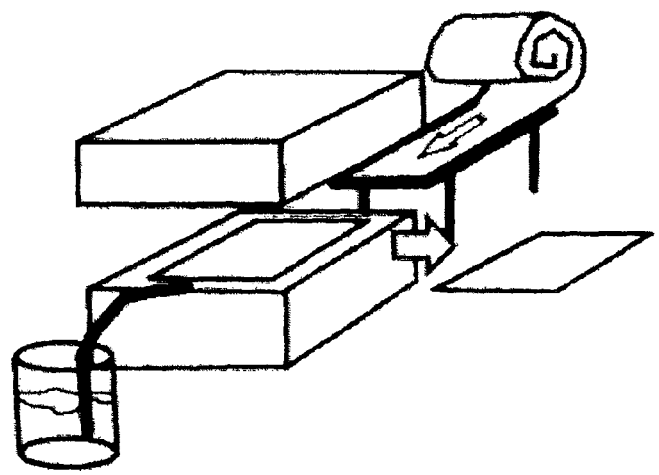
FIGURE 3: *Panel Moulding*
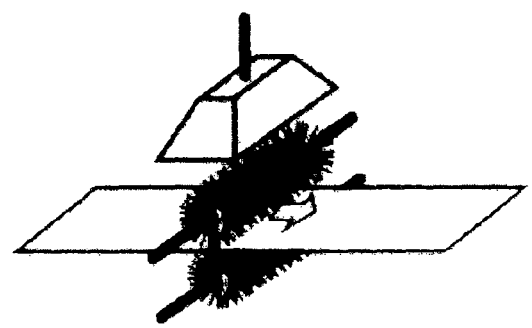
FIGURE 4: *Abrading the Bonding Area (Brush method)*
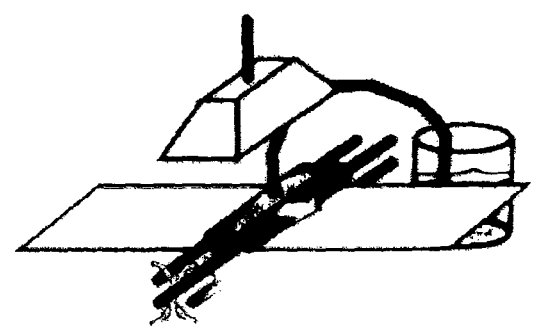
FIGURE 5: *Application of Bonding Resin*

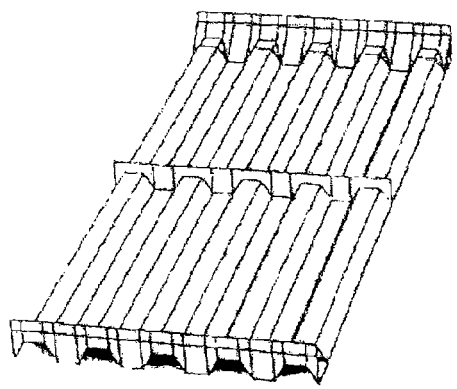
FIGURE 6: *Outer Panel with Hex Corrugation*
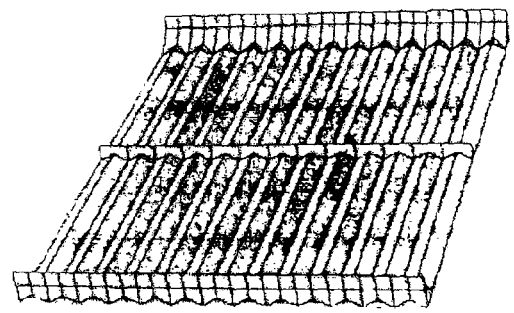
FIGURE 7: *Outer Panel with V Corrugation*
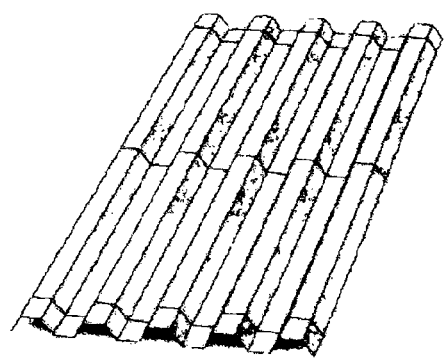
FIGURE 8: *Inner Panel with Hex Corrugation. Made with conductive carbon fabric composite*

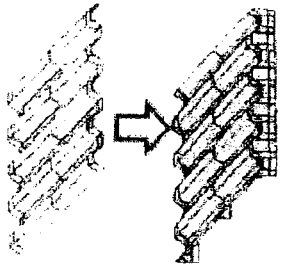
FIGURE 9: *Load Outer structural "Hex" Panel. Note: Stack Clamp/Jig Table not shown.*
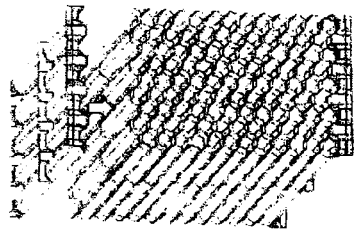
FIGURE 10: *Load Inner Carbon Composite Panel*
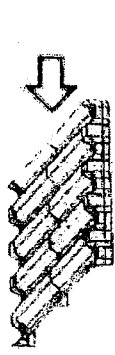
FIGURE 11: *Load remaining Inner Carbon Composite Panel*
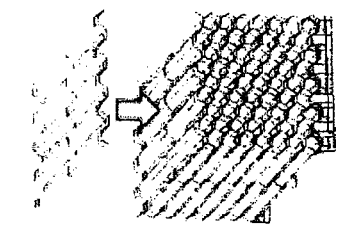
FIGURE 12: *Load Outer structural "Hex" Panel*

FIGURE 13: *Load Outer structural "V" Panel*
FIGURE 14: *Load Outer structural "V" Panel*
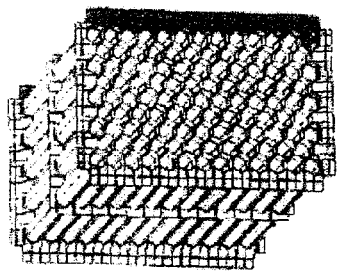
FIGURE 15: *Final Tube Bundle Assembly*

US 9,009,944 B2

ASSEMBLY OF WET ELECTROSTATIC PRECIPITATOR

REFERENCE TO RELATED APPLICATIONS

This application is a U.S. National Phase filing under 35 USC 371 of PCT/CA2010/001404 filed Sep. 9, 2010 claiming priority under 35 USC 119(e) from U.S. Provisional Patent Application No. 61/272,303 filed Sep. 9, 2009.

FIELD OF THE INVENTION

This invention relates to the assembly of a wet electrostatic precipitator (WESP), in particular collector tube bundles therefor.

BACKGROUND TO THE INVENTION

Wet electrostatic precipitators (WESP) have been used for many years to remove dust, acid mist and other particulates from water-saturated air and other gases by electrostatic means. In a WESP, particulates and/or mist laden water-saturated air flows in a region of the precipitator between discharge and collecting electrodes, where the particulates and/or mist is electrically charged by corona emitted from the high voltage discharge electrodes. As the water-saturated gas flows further within the WESP, the charged particulates matter and/or mist is electrostatically attracted to grounded collecting plates or electrodes where it is collected. The accumulated materials are continuously washed off by both an irrigating film of water and periodic flushing.

This type of system is used to remove pollutants from gas streams exhausting from various industrial sources, such as incinerators, coke ovens, glass furnaces, non-ferrous metallurgical plants, coal-fired generation plants, forest product facilities, food drying plants and petrochemical plants.

The electrodes used in WESPs are commonly formed of stainless steel. In International Patent Application Publication No. WO 2008/154,735 and International Patent Application No. PCT/CA2010/000377 assigned to the assignee hereof and the disclosures of which are incorporated herein by reference, we have described the provision of WESP parts constructed of electrically-conductive corrosion and spark-resistant carbon composites. Such materials show comparable or superior properties to stainless steel and permit WESPs to be constructed at lower cost.

SUMMARY OF INVENTION

We provide herein a procedure for assembly of WESP electrode bundles from conductive carbon composites. The present invention uses a so-called "stacked panel" method of forming hexagonal tubes.

In such a procedure, conductive carbon composite material is molded into corrugated form, the corrugations of mating surfaces of adjacent panels are abraded to expose carbon fibres, adjacent corrugated strips are adhered at their abutting corrugations to form a hexagonal tube bundle, and the corrugated tube bundle is assembled with outer structural panels.

The procedure described herein allows for carbon-carbon contact required for conduction. The procedure is flexible, providing the ability to manufacture one stock generic panels for different size tube bundles with low capital and operating costs. The composite material is light weight yet able to withstand sparking and corrosion.

BRIEF DESCRIPTION OF DRAWING

FIG. 1 is a perspective view of a WESP electric bundle product according to one embodiment of the invention;

FIG. 2 is a perspective view of stacked panels according to one embodiment of the invention;

FIG. 3 is a schematic perspective view of the panel molding step;

FIG. 4 is a schematic perspective view of abrasion of the bonding areas of the panel;

FIG. 5 is a schematic perspective view of the application of bonding material to the abraded areas of the panel;

FIG. 6 is a perspective view of an outer panel with hexagonal corrugation;

FIG. 7 is a perspective view of the outer panel with V corrugation;

FIG. 8 is a perspective view of an inner panel constructed of conductive carbon composite material with hexagonal corrugation; and FIGS. 9 to 15 illustrate the sequence of assembly of the electrode stack.

DESCRIPTION OF PREFERRED EMBODIMENT

Referring to the drawings, the first step in the assembly procedure is the formation of elongate strips of conductive carbon material which are molded into a corrugated shape (FIGS. 2 and 3).

Any desired molding procedure may be used which enables corrugated strips of carbon composite material to be formed, including vacuum assisted resin transfer molding, as schematically illustrated in FIG. 3 and/or resin infusion.

The conductive composite material utilized herein is a conductive hybrid composite material designed for highly corrosive operating conditions including dry and saturated mist environments with elevated temperatures. The hybrid composite material is a blend of glass and/or carbon fibres and thermosetting resins developed for applications subjected to corona voltage flash over, spark, erosion, corrosion and power arc, including wet electrostatic precipitation. Such resins include thermosetting polyvinyl ester resin.

In particular, the composite material comprises carbon fiber woven roving and/or carbon fibres within a thermosetting resin where extremely strong molecular building blocks form totally cross-linked structures bonded to each other and at interconnects. Carbon fibres are used as the reinforcing material in areas of the strips required to be conductive while a glass fibre wrap can be used to improve the structural strength of the panel assembly (tube bundle).

The surface of the formed strips then are abraded at the raised portions of the corrugations to expose the conductive carbon fibres for fibre-fibre contact with adjacent mated panels. This abrasion provides for stronger bonding and proper electrical conductivity in the bonded areas. Bonding resin then is applied to the abraded mating surface of the corrugated strips (FIGS. 4 and 5).

Another panel then is stacked with the first panel with the corrugations abutting one another to become adhered together (FIG. 2). This procedure is repeated until a stack of hexagonal tubes of the desired size has been prepared.

The outer panels are the main structural components of the tube bundles and holds the dead and earthquake loads of both the upper equipment and the lower tube bundles.

The outer panels are broken down into two corrugation forms. One corrugation form is a "Hat" section corrugation having a hexagonal-shaped 'H' corrugation (FIG. 6) and the other is a hex-shaped V corrugation (FIG. 7). These panels, including flanges and stiffening ribs can be constructed of glass-fibre reinforced materials.

The panels may be assembled into the final tube bundles (FIG. 1) utilizing a stack clamp/jig table. The assembly steps are shown in FIGS. 9 to 15.

SUMMARY OF THE DISCLOSURE

In summary of this disclosure, the present invention provides a method of assembly of conductive tube bundles using conductive carbon composite materials. Modifications are possible within the scope of this invention.

What we claim is:

1. A method of forming a hexagonal tube bundle comprising:
   forming strips of electrically-conductive material comprising hybrid composite material which is a blend of glass and/or carbon fibres and thermosetting resin resistant to corona voltage flash over, spark, erosion, corrosion and power arc into corrugated strips;
   abrading intended abutting portions of the corrugated strips to expose conductive carbon fibres for fibre-fibre contact with adjacent mated panels;
   applying electrically conductive adhesive to the abraded intended abutting surface(s); and
   assembling multiple ones of the corrugated strips with corrugations in abutting relationship until a desired bundle size has been achieved, thereby forming the hexagonal tube bundle for use in an electrostatic precipitator.

2. The method of claim 1 further comprising assembling outer panels with the hexagonal tube bundle.

* * * * *